United States Patent [19]

Forster et al.

[11] 4,209,409

[45] Jun. 24, 1980

[54] DRILLING FLUID ADDITIVES

[75] Inventors: John W. Forster, Corpus Christi, Tex.; Louis E. Roper, Bartlesville, Okla.

[73] Assignee: Phillips Petroleum Company, Bartlesville, Okla.

[21] Appl. No.: 907,470

[22] Filed: May 19, 1978

Related U.S. Application Data

[63] Continuation-in-part of Ser. No. 744,057, Nov. 22, 1976, abandoned, Continuation-in-part of Ser. No. 621,098, Oct. 9, 1975, abandoned.

[51] Int. Cl.$^2$ ................................................ C09K 7/02
[52] U.S. Cl. ................................ 252/8.5 A; 252/8.5 B
[58] Field of Search .............. 252/8.5 A, 8.5 B, 8.5 C, 252/8.5 L

[56] References Cited

U.S. PATENT DOCUMENTS

| | | | |
|---|---|---|---|
| 1,943,584 | 1/1934 | Cross | 252/8.5 |
| 2,727,001 | 12/1955 | Rowe | 252/8.5 |
| 3,146,199 | 8/1964 | Salathiel | 252/8.5 |
| 3,185,642 | 5/1965 | Sawyer et al. | 252/8.5 |
| 3,220,947 | 11/1965 | Sawyer | 252/8.5 |
| 3,360,461 | 12/1967 | Anderson et al. | 252/8.5 |
| 3,471,402 | 10/1969 | Shannon et al. | 252/8.5 |
| 3,691,070 | 9/1972 | Pippen | 252/8.5 |

OTHER PUBLICATIONS

Mondshine et al., "A New Salt Mud from Q-Broxin-/Aquagel", article in *Baroid News Bulletin*, vol. 15, No. 3, pp. 10–17, (Pub. by Baroid Division of National Lead Co., Houston, Texas).

*Primary Examiner*—Herbert B. Guynn

[57] ABSTRACT

The addition of magnesium oxide to a drilling fluid additive comprising bentonite and ferrochrome lignosulfonate, the drilling fluid additive having a pH of about 9.5 to 12, increases the usefulness of such a drilling fluid additive and increases considerably the yield point of the drilling fluid containing this drilling fluid additive.

14 Claims, No Drawings

DRILLING FLUID ADDITIVES

This is a continuation-in-part application of our copending patent application, Ser. No. 744,057, filed Nov. 22, 1976, now abandoned, which was a continuation-in-part of application Ser. No. 621,098, filed Oct. 9, 1975, now abandoned.

This invention relates to drilling fluids. In one of its aspects, this invention relates to drilling fluid additives. A further aspect of this invention relates to compositions for use in formation of a drilling additive. Still a further aspect of this invention relates to a process for cleaning a drill hole.

BACKGROUND OF THE INVENTION

It is known that prehydrated bentonite can be added to salt water drilling fluids in order to increase their viscosity. The bentonite is prehydrated in fresh water, and the clay suspension thus obtained is added to the salty water. The drilling fluid thereby becomes more effective as a fluid for carrying out cuttings from the bore hole. It has also been proposed to include ferrochrome lignosulfonate in a prehydrated bentonite-containing drilling fluid additive mixture. The ferrochrome lignosulfonate is reported to stabilize the hydrated bentonite. It would be desirable to further improve the properties of a drilling fluid additive mixture comprising bentonite and ferrochrome lignosulfonate, particularly in order to increase the yield point of the drilling fluid. An increased yield point generally means that the fluid will carry more drill cuttings out of the drill hole. It would be particularly desirable to increase the yield point of the drilling fluid without increasing the plastic viscosity.

THE INVENTION

It is thus one object of this invention to provide a new mixture that can be converted into a drilling fluid additive.

Another object of this invention is to provide a drilling fluid additive.

Still a further object of this invention is to provide a drilling fluid.

Still another object of this invention is to improve the yield point of a drilling fluid comprising bentonite and ferrochrome lignosulfonate.

A still further object of this invention is to provide a process for cleaning the drill hole using a special drilling fluid that is both relatively inexpensive and effective.

These and other objects, advantages, details, features, and embodiments of the invention will become apparent to those skilled in the art from the following description of the invention, as well as from the appended claims.

In accordance with this invention, we have now found that adding magnesium oxide to a slurry of prehydrated bentonite and ferrochrome lignosulfonate, the slurry having a pH of about 9.5 to 12, increases the life of this slurry when later diluted with salty water. By "salty water" an aqueous drilling fluid is meant containing at least 8 and generally at least 10 weight percent sodium chloride. This invention thus provides a slurry composition which comprises fresh water, bentonite, ferrochrome lignosulfonate, and magnesium oxide, and which has a pH of about 9.5 to 12.

In accordance with one embodiment of this invention, there is provided an additive mixture comprising bentonite, ferrochrome lignosulfonate, and magnesium oxide. This mixture when mixed with fresh water results in a drilling fluid additive with a high yield point.

Preferably the additive composition, in addition to the three ingredients bentonite, ferrochrome lignosulfonate, and magnesium oxide, contains a sufficient quantity of a basic material so that the slurry made from the additive mixture and fresh water will have a pH of about 9.5 to 12. The main limitation to the basic material are economic reasons. Sodium hydroxide is the presently preferred basic material in the additive mixture. Preferably, thus the additive mixture consists essentially of bentonite, ferrochrome lignosulfonate, magnesium oxide, and sodium hydroxide. However, other basic materials such as potassium hydroxide can be used if they do not adversely interfere with the other ingredients of the additive mixture.

The additive mixture of this invention contains the three main ingredients in the following ranges:

|  | Broad Range Parts by Weight |
|---|---|
| Bentonite | 15 to 40 |
| Ferrochrome lignosulfonate | 2½ to 3½ |
| Magnesium oxide | ½ to 3 |

In case sodium hydroxide is present in the additive mixture, to achieve the proper pH of the slurry made from that mixture, the mixture will contain ½ to 2 parts by weight of sodium hydroxide.

In accordance with another embodiment of this invention, there is provided a slurry composition consisting essentially of fresh water, bentonite, ferrochrome lignosulfonate, magnesium oxide, and enough basic material to result in a pH of about 9.5 to 12 of said slurry. This slurry, when added to salt water drilling fluid, increases the yield point thereof considerably, which means the drilling fluid containing the slurry carries a larger quantity of drill cuttings out of a drill hole.

Sodium hydroxide is presently the preferred basic material, which is contained in a slurry composition of this invention. It is, however, to be understood that other basic materials that do not adversely interfere with the bentonite, the ferrochrome lignosulfonate, and the magnesium oxide can be used instead of the sodium hydroxide.

The quantities of the ingredients that can be used in the slurry composition of this invention per barrel of fresh water are generally 15 to 40 ppb bentonite, 2 to 10 ppb ferrochrome lignosulfonate, and ½ to 3 ppb magnesium oxide. Best results are obtained, however, by employing quantities of the various ingredients within the broad ranges, and more specifically the preferred ranges, as shown in the following table:

| Slurry Composition (Pounds per Barrel of Fresh Water) | | |
|---|---|---|
|  | Broad Range | Preferred Range |
| Bentonite | 15 to 40 | 30 to 35 |
| Ferrochrome lignosulfonate | 4 to 10 | 4 to 6 |
| Magnesium oxide | ¾ to 3 | ¾ to 1 |

Yet more preferred is a slurry composition containing about 4 ppb of ferrochrome lignosulfonate and about ¾ ppb of magnesium oxide. In case sodium hydroxide is used as the basic material in the slurry, the slurry will broadly contain ½ to 2 pounds of sodium hydroxide per barrel of fresh water, more preferably ¾ to 1 pound.

The slurry composition of this invention preferably consists essentially of fresh water, bentonite, ferrochrome lignosulfonate, sodium hydroxide, and magnesium oxide in the quantities defined above. The slurry composition may, however, contain a small quantity of asbestos fibers, preferably about 1 to 3 pounds of asbestos fibers per barrel of fresh water.

Still a further embodiment of this invention consists in a drilling fluid. The drilling fluid of this invention contains up to about 6 volumes of salt water drilling liquid and about one volume of the slurry composition defined above. The preferred drilling liquid is composed of about 1 to about 4 volumes of salt water drilling liquid and about one volume of the slurry composition defined above.

The slurry composition of this invention and the drilling fluid of this invention are prepared as follows: First the ingredients bentonite, ferrochrome lignosulfoate, magnesium oxide, and the basic material, if necessary, are mixed together in the proper quantities in fresh water to form a slurry. This slurry is yielded. Yielding means to allow the bentonite particles to hydrate, i.e., to separate, soak up water and gain size; the yielding or hydrating preferably is done while stirring the slurry. This yielding, when carried out in the field, will take place in a period of time of about six hours. After this yielding, a slurry composition is ready to be mixed with the salty drilling fluid. This salty water or salty drilling fluid contains at least 8, and generally at least 10, weight percent of sodium chloride.

In accordance with a still further embodiment of this invention, there is provided a process for cleaning a drill hole. This process comprises the steps of injecting a drilling fluid as defined above into the drill hole, admixing this drill fluid with cuttings in the drill hole to form a mixture and withdrawing that mixture from the drill hole. In this process the slurry composition defined above can be pumped into the hole as an undiluted additive, or the slurry can be diluted with up to about six volumes of salt water or salty drilling fluid per volume of slurry drilling additive composition defined.

The invention will be still more fully understood from the following examples:

EXAMPLE I

This calculated example shows the use of a slurry for cleaning a drill hole.

To 100 bbls of fresh water in a prehydrating pit
3,000 lbs. bentonite,
300 lbs. ferrochrome lignosulfonate,
75 lbs. sodium hydroxide, and
100 lbs. magnesium oxide
are added via a centrifugal pump to said pit. The mixture is sheared with, e.g., a Lightnin mixer or a mud gun. After the shearing the mixture is allowed to stand for yielding of the bentonite for about one hour. Additional yielding will occur if the mixture is allowed to stand for a longer period of time.

The resulting slurry is added to a salty drilling fluid as necessary to provide the viscosity for drill hole cleaning. For this purpose intermittent slugs of about 20 barrels of the slurry prepared as described in this example are added to the drilling mud system to clean the drill hole of excess cuttings. This is advantageously done before a round trip is carried out, e.g., to exchange the bit. Several slugs of the slurry composition of this invention may be necessary to clean the hole.

EXAMPLE II

This example is given to show results obtained in the laboratory. A drilling liquid was prepared by adding one part of the various additives defined in the following table to varying quantities of saturated salt water as shown in this table. The mixtures in accordance with this invention additionally contained 0.75 and 3.0 lbs. magnesium oxide (MgO) per barrel of fresh water, as well as 0.5 ppb. The mixtures were prepared by blending the ingredients together and letting the mixture stand for about one hour. The blending was carried out in a standard laboratory blender, which achieved a prehydrating that was comparable to a prehydration of several hours in a pit using, e.g., a mud gun.

The plastic viscosity of the material thus produced was determined in accordance with API RP 13B Standard Procedure for Testing Drilling Fluids. Also the yield point of the material was determined in accordance with the same standard. The results of the various runs are shown in the following Table I.

TABLE I

| | Ingredients in Fresh Water (mixture) | | | | Volume Ratio of | Properties of Test Specimen | | |
|---|---|---|---|---|---|---|---|---|
| Run No. | Bentonite prehydrated, ppb* | Ferrochrome lignosulfonate, ppb | NaOH ppb | MgO ppb | Mixture to Saturated Salt Water (Test Specimen) | Plastic Viscosity, centipoise | Yield Point, lbs/100 sq.ft. | Yield Point Increase over Bentonite alone, lb/100 sq.ft. |
| 1 | 15 | — | 0.75 | — | 1:1 | 3 | 3 | |
| 2 | 15 | — | 0.75 | 0.5 | 1:1 | 3 | 10 | 7 |
| 3 | 15 | 2.0 | 0.75 | — | 1:1 | 9 | 11 | 8 |
| 4 | 15 | 2.0 | 0.75 | 0.5 | 1:1 | 10 | 12 | 9 |
| 5 | 15 | — | 0.75 | — | 1:3 | 3 | 3 | |
| 6 | 15 | — | 0.75 | 0.5 | 1:3 | 2 | 4 | 1 |
| 7 | 15 | 2.0 | 0.75 | — | 1:3 | 3 | 6 | 3 |
| 8 | 15 | 2.0 | 0.75 | 0.5 | 1:3 | 4 | 7 | 4 |
| 9 | 15 | — | 0.75 | — | 1:7 | 3 | 0 | |
| 10 | 15 | — | 0.75 | 0.5 | 1:7 | 2 | 1 | 1 |
| 11 | 15 | 2.0 | 0.75 | — | 1:7 | 3 | 0 | 0 |
| 12 | 15 | 2.0 | 0.75 | 0.5 | 1:7 | 3 | 3 | 3 |
| 13 | 30 | — | 0.75 | — | 1:1 | 5 | 34 | — |
| 14 | 30 | — | 0.75 | 0.75 | 1:1 | 5 | 40 | 6 |
| 15 | 30 | 4 | 0.75 | — | 1:1 | 8 | 96 | 62 |
| 16 | 30 | 4 | 0.75 | 0.75 | 1:1 | 7 | 127 | 93 |
| 17 | 30 | — | 0.75 | — | 1:2 | 4 | 20 | — |
| 18 | 30 | — | 0.75 | 0.75 | 1:2 | 5 | 20 | 0 |
| 19 | 30 | 4 | 0.75 | — | 1:2 | 5 | 75 | 55 |
| 20 | 30 | 4 | 0.75 | 0.75 | 1:2 | 12 | 100 | 80 |

TABLE I-continued

| | Ingredients in Fresh Water (mixture) | | | | Volume Ratio of | Properties of Test Specimen | | |
|---|---|---|---|---|---|---|---|---|
| Run No. | Bentonite prehydrated, ppb* | Ferrochrome lignosulfo- nate, ppb | NaOH ppb | MgO ppb | Mixture to Saturated Salt Water (Test Specimen) | Plastic Viscosity, centipoise | Yield Point, lbs/100 sq.ft. | Yield Point Increase over Bentonite alone, lb/100 sq.ft. |
| 21 | 30 | — | 0.75 | — | 1:4 | 4 | 10 | — |
| 22 | 30 | — | 0.75 | 0.75 | 1:4 | 5 | 10 | 0 |
| 23 | 30 | 4 | 0.75 | — | 1:4 | 5 | 25 | 15 |
| 24 | 30 | 4 | 0.75 | 0.75 | 1:4 | 5 | 38 | 28 |
| 25 | 30 | — | 0.75 | — | 1:8 | 4 | 3 | — |
| 26 | 30 | — | 0.75 | 0.75 | 1:8 | 3 | 7 | 4 |
| 27 | 30 | 4 | 0.75 | — | 1:8 | 4 | 7 | 4 |
| 28 | 30 | 4 | 0.75 | 0.75 | 1:8 | 5 | 10 | 7 |
| 29 | 40 | — | 1.5 | — | 1:1 | 5 | 23 | — |
| 30 | 40 | — | 1.5 | 3.0 | 1:1 | 4 | 28 | 5 |
| 31 | 40 | 10.0 | 1.5 | — | 1:1 | 27 | 73 | 50 |
| 32 | 40 | 10.0 | 1.5 | 3.0 | 1:1 | 22 | 149 | 126 |
| 33 | 40 | — | 1.5 | — | 1:4 | 4 | 3 | — |
| 34 | 40 | — | 1.5 | 3.0 | 1:4 | 4 | 7 | 4 |
| 35 | 40 | 10.0 | 1.5 | — | 1:4 | 11 | −4 | −7 |
| 36 | 40 | 10.0 | 1.5 | 3.0 | 1:4 | 6 | 3 | 0 |
| 37 | 40 | — | 1.5 | — | 1:8 | 3 | 1 | |
| 38 | 40 | — | 1.5 | 3.0 | 1:8 | 4 | 2 | 1 |
| 39 | 40 | 10.0 | 1.5 | — | 1:8 | 4 | −1 | −2 |
| 40 | 40 | 10.0 | 1.5 | 3.0 | 1:8 | 5 | 0 | −1 |

*Pounds per barrel of fresh water.

The results shown in the table demonstrate a considerable improvement in the yield point when the magnesium oxide and the ferrochrome lignosulfonate are both combined with the prehydrated bentonite slurry. Runs 13 to 24 and 29–32 clearly show that the yield point of the slurry with only the prehydrated bentonite is increased by a larger amount with both additives ferrochrome lignosulfonate and MgO than the sum of increases achieved by either of the two additives alone. This valuable and unexpected property makes possible a considerable reduction in the cost of the slurry, since the quantity of the bentonite used can be substantially reduced when adding a small amount of the inexpensive magnesium oxide to the drilling fluid. This fluid still achieves the same results as when containing the large quantity of bentonite but no magnesium oxide.

EXAMPLE III

This example is given to show how the properties of the respective drilling fluids are influenced by hot rolling the mixture in accordance with the invention and the known mixture. The hot rolling is carried out in accordance with standard procedures by filling the drilling liquid into a bottle and rolling the bottle on a pair of rollers for the time shown in the following table and under the temperature shown in the table. The mixture of Run 15 in the following table is the same mixture as that used in run 15 of Table I. The mixture of run 16 is the mixture in accordance with this invention, and is the same as that used in run 16 of Table I. The test specimen used was a mixture of 1:1 volume ratio of the mixture shown in the table with saturated salt water. Runs 41 and 42 are the same as Runs 15 and 16 of Table I and are shown here again for comparison. The properties of the treated specimens were tested as explained above, and the results obtained are shown in the following table:

TABLE II

| | | Treatment: Hot Rolling at 150° F. for | Properties of Test Specimen: | |
|---|---|---|---|---|
| Run | Mixture of | | Plastic Viscosity, centipoise | Yield Point, lb/100 sq.ft. |
| 41 | Run 15 | 0 hrs | 8 | 96 |
| 42 | Run 16 (Inv.) | 0 hrs | 7 | 127 |
| 43 | Run 15 | 16 hrs | 20 | 70 |
| 44 | Run 16 | 16 hrs | 20 | 140 |
| 45 | Run 15 | 40 hrs | 25 | 50 |
| 46 | Run 16 | 40 hrs | 15 | 90 |

The values of this table show that during a hot rolling aging treatment of the drilling fluids, the fluids in accordance with this invention are far superior to the fluid that does not contain any magnesium oxide, but otherwise is identical with the fluid of this invention. An improvement in the yield point of about 100 percent is achieved by 0.75 lb. magnesium oxide per barrel of fresh water. This surprising result again demonstrates the value of the present invention. Since the yield point of the mixture of this invention is about twice as high as the yield point of the prior art mixture, the same cuttings capacity of the drilling fluid can be obtained by using considerably less bentonite than is used in the mixture of the prior art.

Reasonable variations and modifications that will become apparent to those skilled in the art can be made in this invention without departing from the spirit and scope thereof.

We claim:

1. A slurry composition of matter consisting essentially of fresh water, about 15 to 40 ppb of bentonite, about 4 to 10 ppb of ferrochrome lignosulfonate, about ¾ to 3 ppb of magnesium oxide, and a sufficient quantity of basic material to result in a pH of the slurry of about 9.5 to 12.

2. A slurry composition in accordance with claim 1 wherein said composition contains 30 to 35 ppb of bentonite, 4 to 6 ppb of ferrochrome lignosulfonate, and ¾ to 1 ppb of magnesium oxide.

3. A slurry composition in accordance with claim 1 wherein said composition contains about 4 ppb of ferrochrome lignosulfonate and about ¾ ppb of magnesium oxide.

4. A slurry composition in accordance with claim 1 additionally containing about 1 to 3 ppb of asbestos fibers.

5. A slurry composition in accordance with claim 1 wherein said basic material is sodium hydroxide.

6. A process to produce a drilling fluid comprising
(a) mixing 15 to 40 ppb of bentonite, 4 to 10 ppb of ferrochrome lignosulfonate, ¾ to 3 ppb of magnesium oxide, and a sufficient quantity of basic substance to fresh water to result in a hydrated bentonite slurry composition having a pH of about 9.5 to 12, and
(b) mixing the resulting hydrated bentonite slurry with a salty drilling liquid containing at least about 8 weight percent sodium chloride in a volume ratio of slurry to salty drilling fluid of about 1:1.

7. A process in accordance with claim 6 comprising mixing ½ to 2 pounds of sodium hydroxide as said basic substance.

8. A process to produce a drilling fluid comprising
(a) mixing 15 to 40 ppb of bentonite, about 4 ppb of ferrochrome lignosulfonate, about ¾ ppb of magnesium oxide, and a sufficient quantity of basic substance to fresh water to result in a hydrated bentonite slurry composition having a pH of about 9.5 to 12, and
(b) mixing the resulting hydrated bentonite slurry with a salty drilling liquid containing at least about 8 weight percent sodium chloride in a volume ratio of slurry to salty drilling fluid within the range of about 1:1 to 1:4.

9. A drilling fluid produced by the process of claim 6.

10. A drilling fluid produced by the process of claim 7.

11. A drilling fluid produced by the process of claim 8.

12. In a process for drilling a well with well drilling tools wherein an aqueous drilling fluid is circulated in the well while drilling, the steps comprising
circulating in said well as said drilling fluid a composition produced by the process of mixing 15 to 40 ppb of bentonite, 4 to 10 ppb of ferrochrome lignosulfonate, ¾ to 3 ppb of magnesium oxide, and a sufficient quantity of basic substance to fresh water to result in a hydrated bentonite slurry composition having a pH of about 9.5 to 12 and then mixing the resulting hydrated bentonite slurry with a salty drilling fluid containing at least about 8 weight percent of sodium chloride in a volume ratio of slurry to salty drilling fluid of about 1:1.

13. A process in accordance with claim 12 wherein said hydrated bentonite slurry composition comprises as said basic material ½ to 2 ppb of sodium hydroxide.

14. In a process for drilling a well with well drilling tools wherein an aqueous drilling fluid is circulated in the well while drilling, the steps comprising,
circulating in said well as said drilling fluid a composition produced by the process of mixing 15 to 40 ppb of bentonite, about 4 ppb of ferrochrome lignosulfonate, about ¾ ppb of magnesium oxide, and a sufficient quantity of basic substance to fresh water to result in a hydrated bentonite slurry composition having a pH of about 9.5 to 12 and then mixing the resulting hydrated bentonite slurry with a salty drilling fluid containing at least about 8 weight percent of sodium chloride in a volume ratio of up to 6 volumes of salty drilling fluid per volume of slurry.

* * * * *